(12) United States Patent
Cho et al.

(10) Patent No.: US 9,545,691 B2
(45) Date of Patent: Jan. 17, 2017

(54) METHOD OF REMOVING WASTE OF SUBSTRATE AND WASTE REMOVING DEVICE THEREOF

(71) Applicant: Taiwan Semiconductor Manufacturing Company Limited, Hsinchu (TW)

(72) Inventors: Chin-Yi Cho, Kaohsiung (TW); Yi-Chuan Teng, Hsinchu County (TW); Shang-Ying Tsai, Taoyuan County (TW); Li-Min Hung, Taoyuan County (TW); Yao-Te Huang, Hsinchu (TW); Jung-Huei Peng, Hsinchu Hsien (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 371 days.

(21) Appl. No.: 14/138,181

(22) Filed: Dec. 23, 2013

(65) Prior Publication Data
US 2015/0174700 A1   Jun. 25, 2015

(51) Int. Cl.
| | |
|---|---|
| *B23K 26/00* | (2014.01) |
| *B23K 26/06* | (2014.01) |
| *B23K 26/36* | (2014.01) |
| *B28D 5/00* | (2006.01) |
| *B08B 7/02* | (2006.01) |
| *B23K 26/40* | (2014.01) |
| *C03B 33/02* | (2006.01) |

(52) U.S. Cl.
CPC ............ *B23K 26/365* (2013.01); *B08B 7/02* (2013.01); *B23K 26/362* (2013.01); *B23K 26/364* (2015.10); *B23K 26/40* (2013.01); *B28D 5/0076* (2013.01); *B23K 2203/50* (2015.10); *C03B 33/0222* (2013.01)

(58) Field of Classification Search
CPC .................. B08B 7/02; B23K 2203/50; B23K 26/36–26/364; B23K 26/365; B23K 26/40; B28D 5/0076; C03B 33/0222
USPC .......................................... 219/121.6–121.86
See application file for complete search history.

(56) References Cited

U.S. PATENT DOCUMENTS

| | | | | |
|---|---|---|---|---|
| 3,633,269 A | * | 1/1972 | Bachmeier | H01L 23/485 156/247 |
| 4,725,511 A | * | 2/1988 | Reber | A44C 27/00 29/896.32 |
| 4,777,583 A | * | 10/1988 | Minami | B41J 2/3353 219/547 |
| 5,022,960 A | * | 6/1991 | Takeyama | H01L 21/4803 216/13 |
| 5,641,400 A | * | 6/1997 | Kaltenbach | B01L 3/5027 204/451 |
| 6,294,439 B1 | * | 9/2001 | Sasaki | H01L 21/3043 257/E21.238 |
| 6,670,269 B2 | * | 12/2003 | Mashino | H01L 21/76898 257/E21.597 |

* cited by examiner

*Primary Examiner* — Sang Y Paik
(74) *Attorney, Agent, or Firm* — Jones Day

(57) ABSTRACT

According to an exemplary embodiment of the disclosure, a method of removing a waste part of a substrate is provided. The method includes: using a laser to partially drill the substrate to define the waste part; and applying megasonic vibration to the substrate to remove the waste part from the substrate.

21 Claims, 13 Drawing Sheets

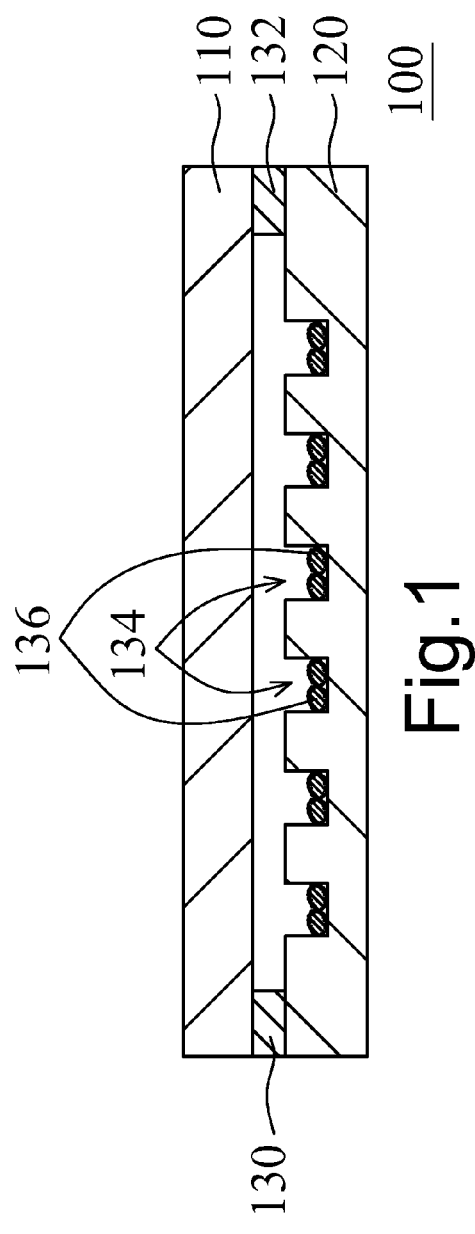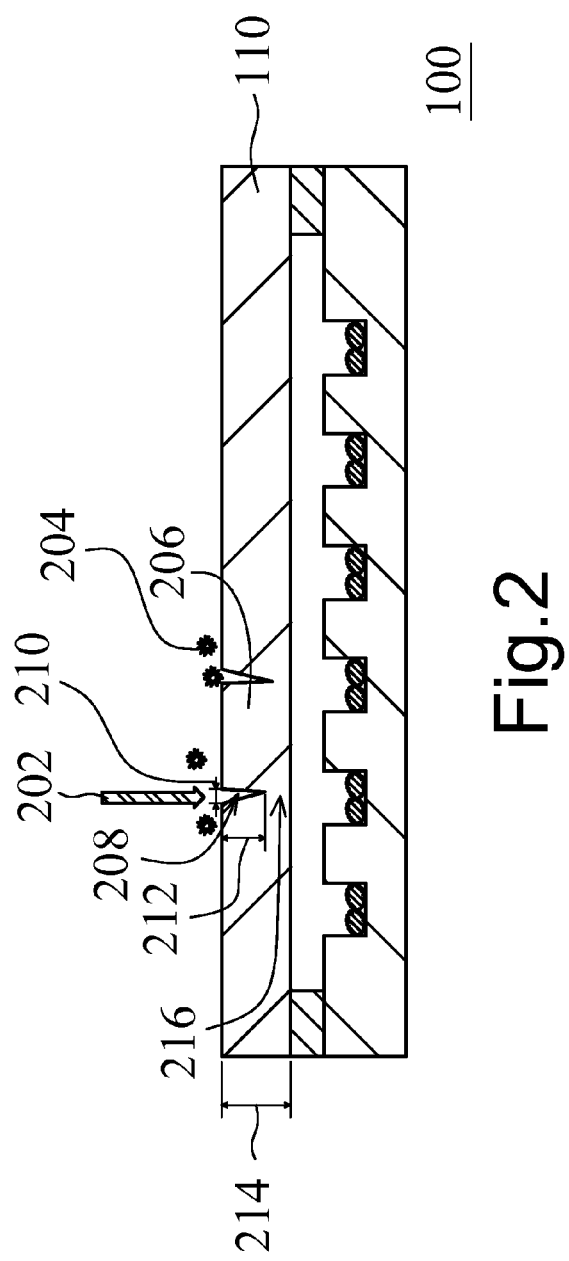

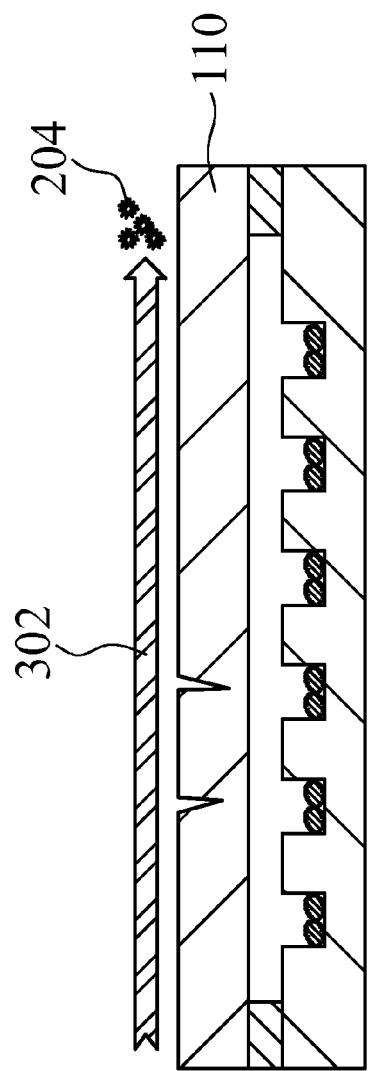
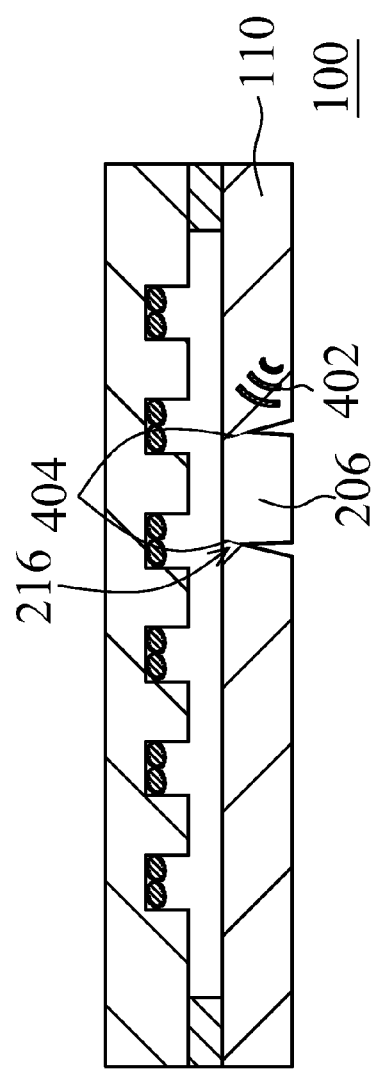

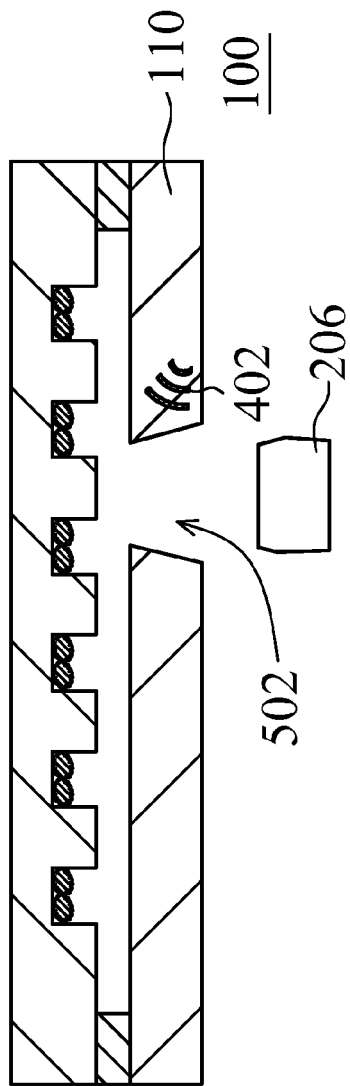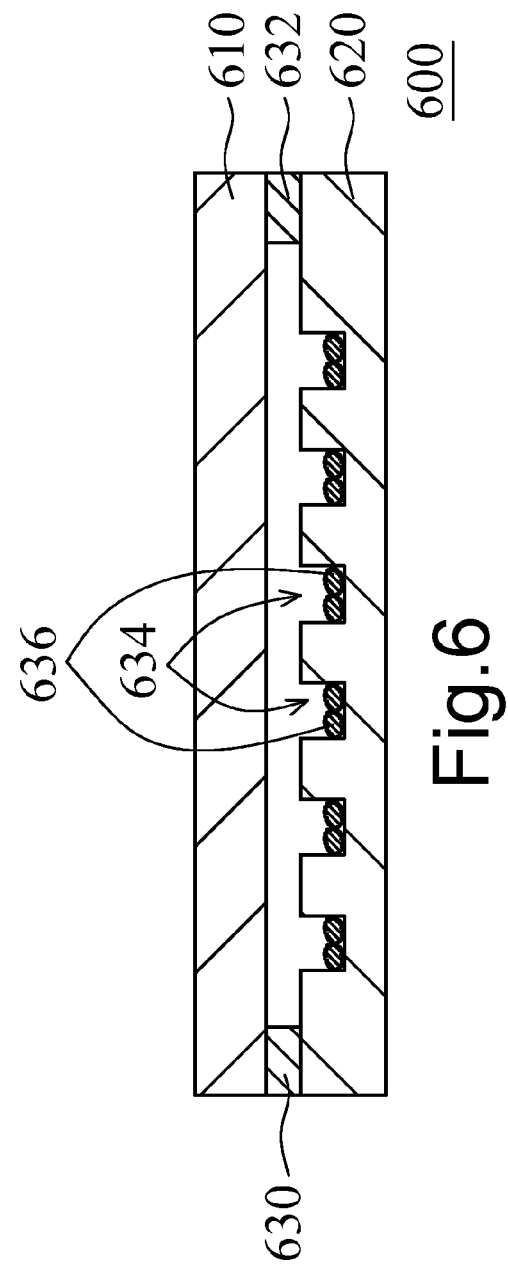

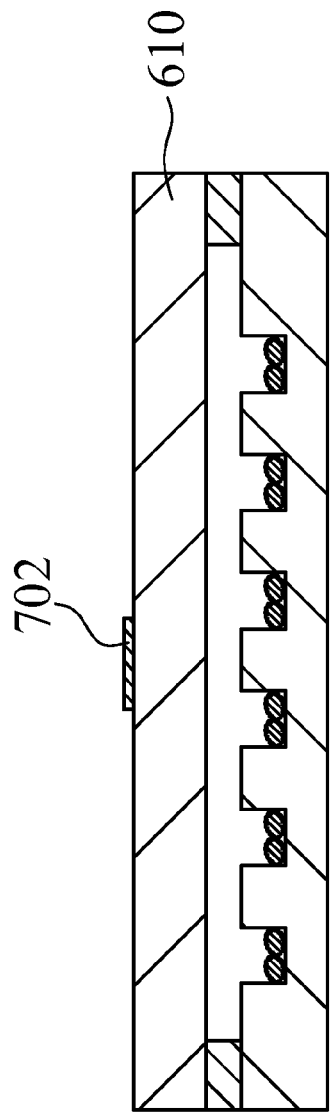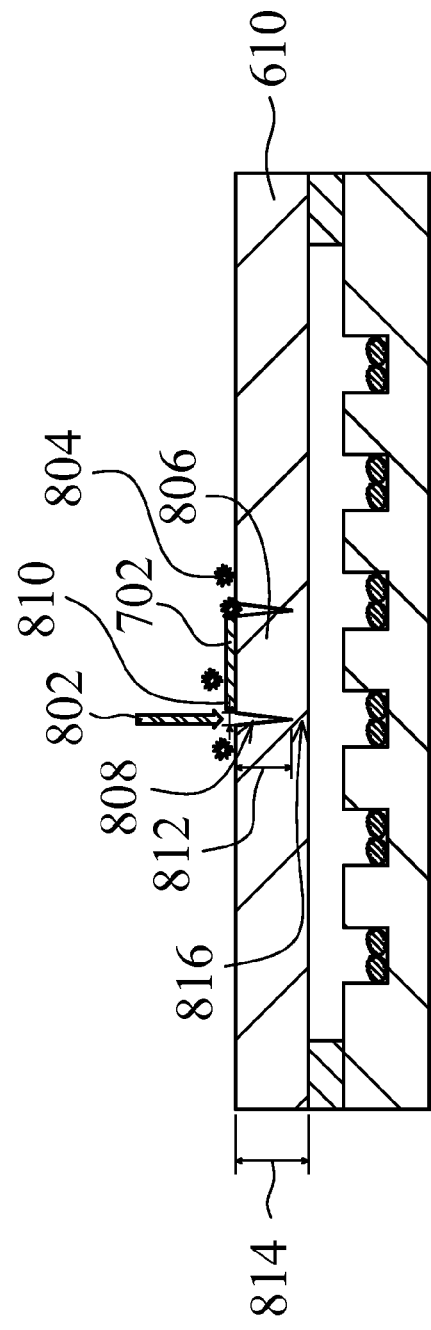

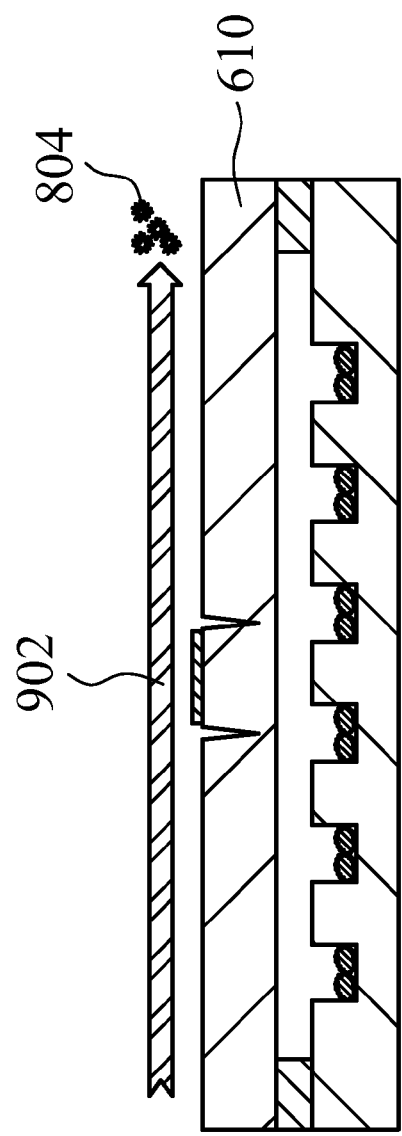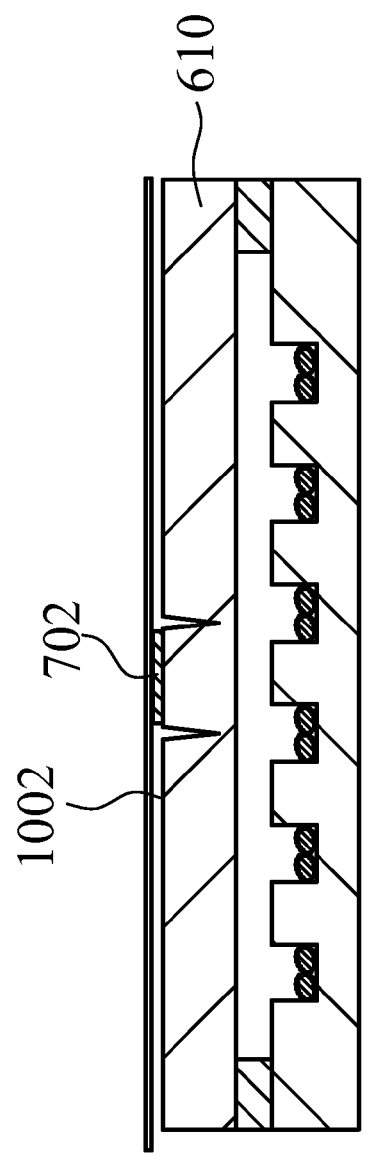

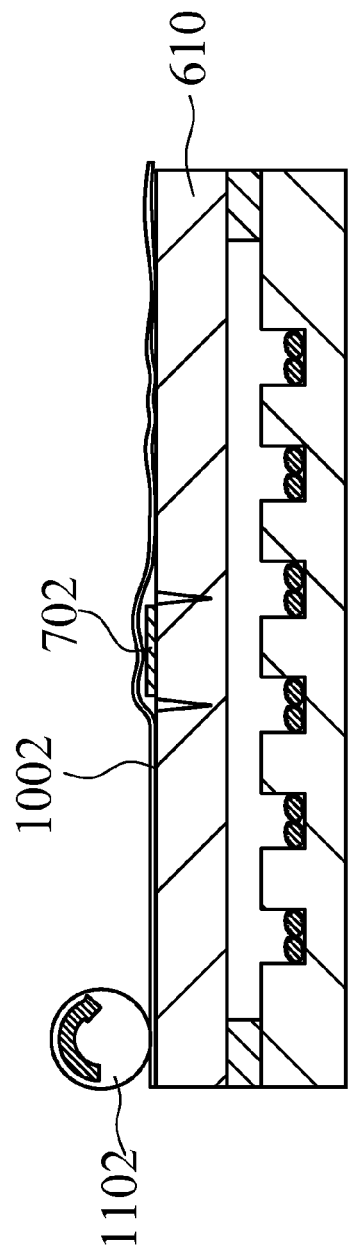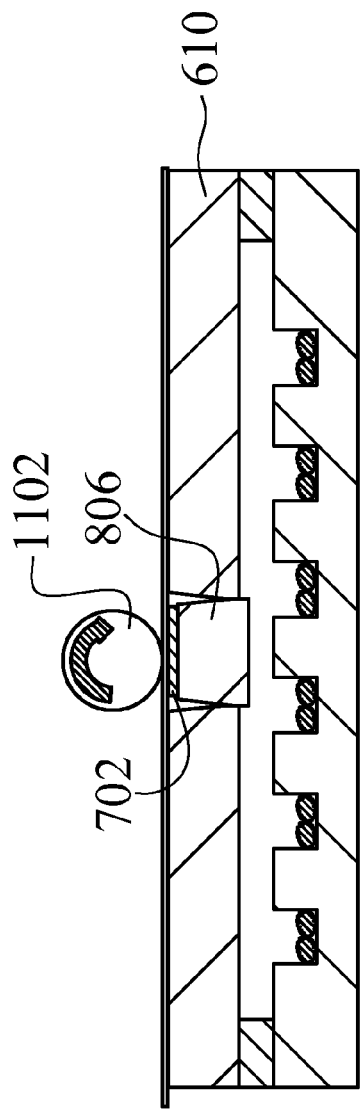

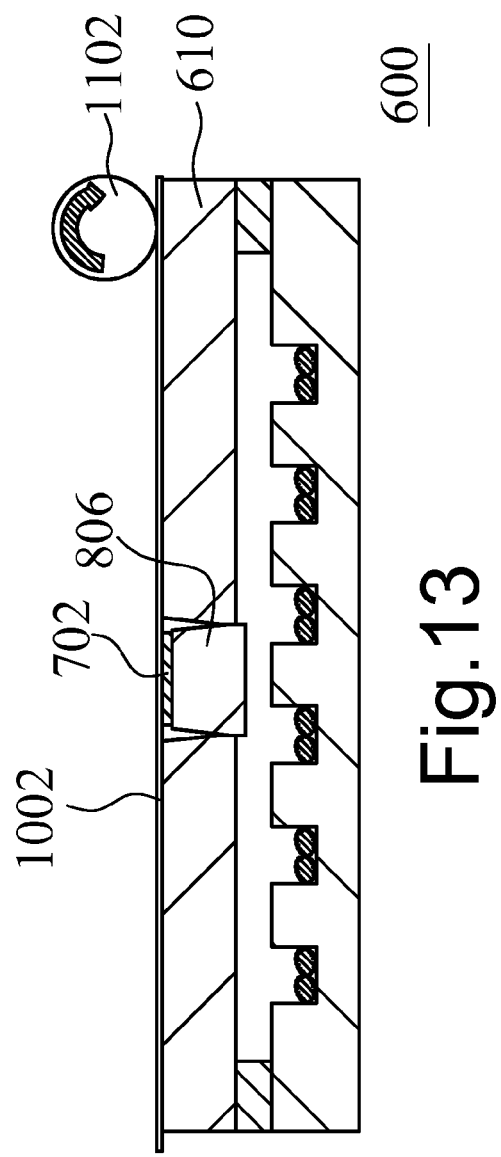
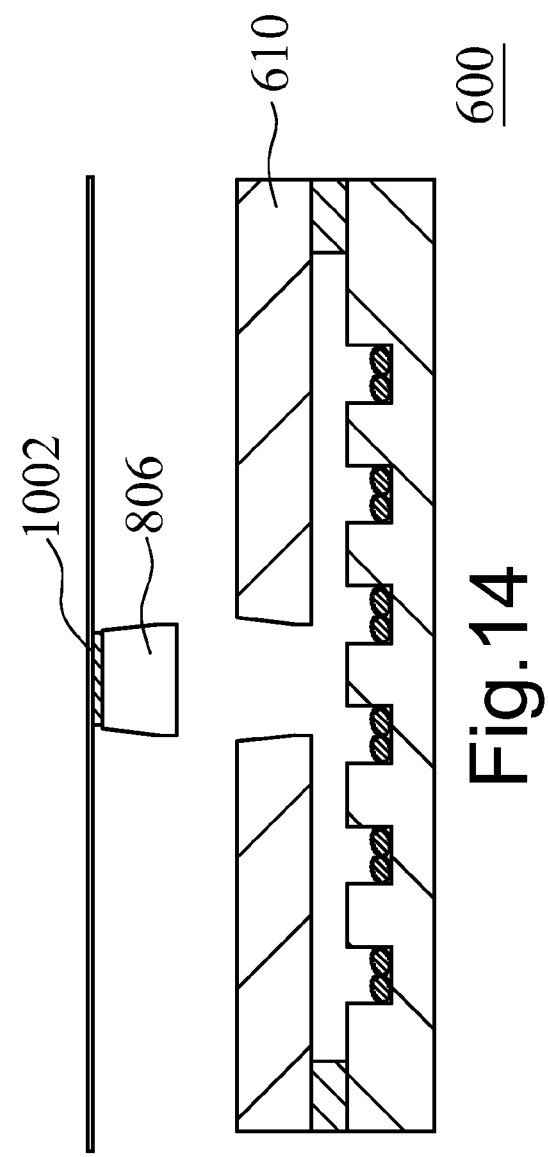

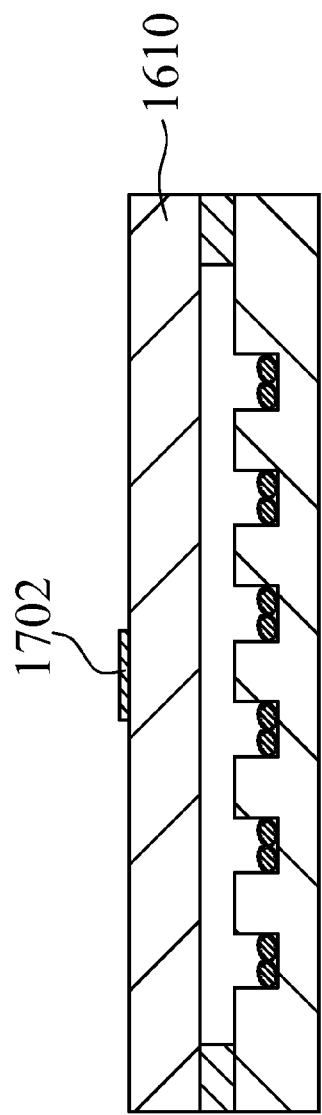
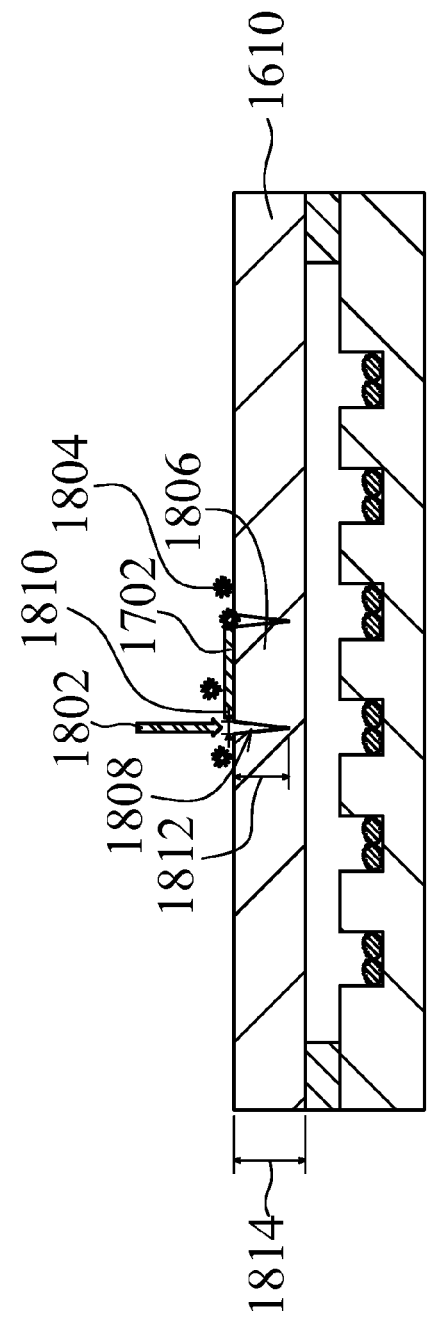

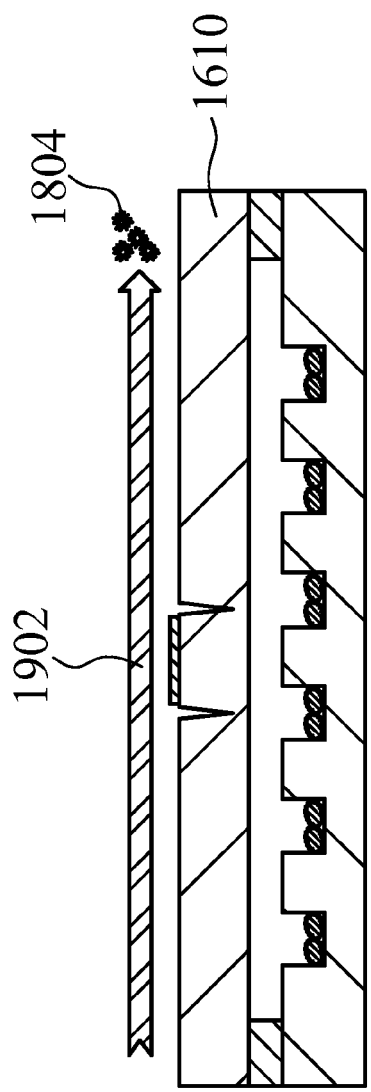
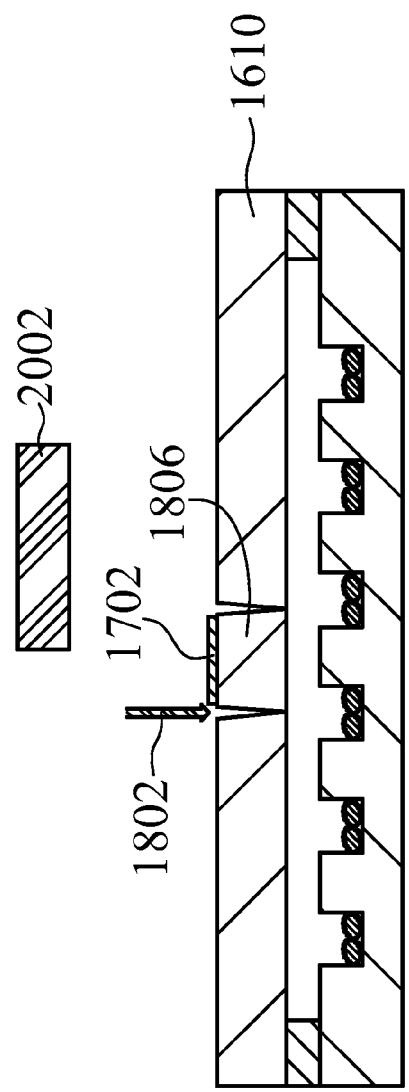
Fig. 19
Fig. 20

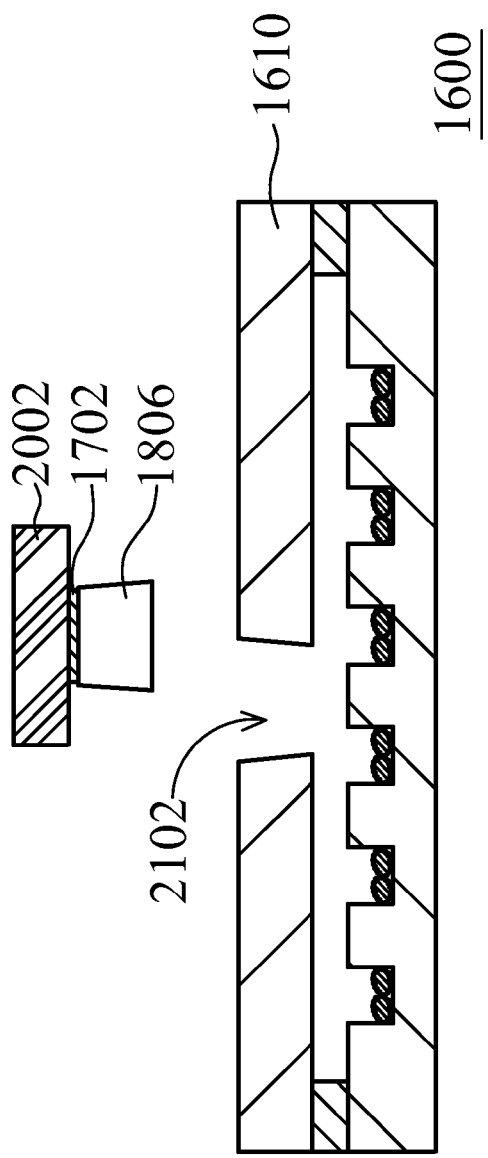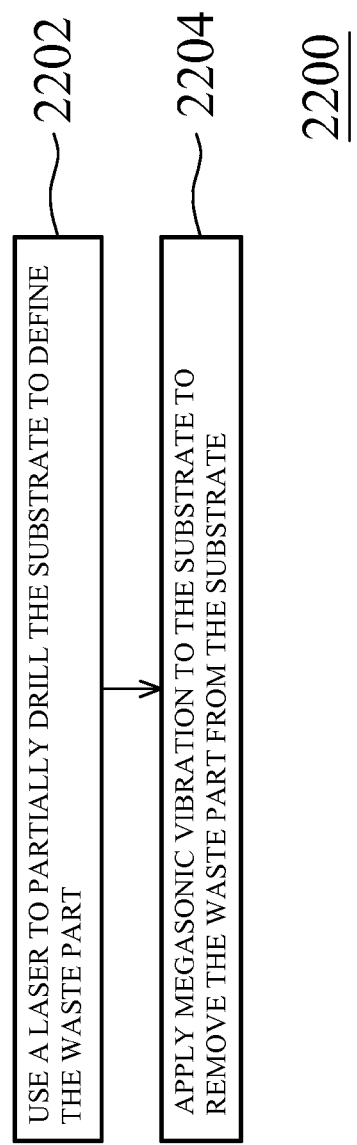

METHOD OF REMOVING WASTE OF SUBSTRATE AND WASTE REMOVING DEVICE THEREOF

FIELD

The technology described in this patent document relates generally to semiconductor processes, and more particularly, to methods of removing waste of a substrate.

BACKGROUND

In a conventional bio-test chip with micro-fluidic structures, two substrates are bonded together to form a micro channel in between. On top of that, some holes are drilled on one of the substrates for letting fluids flow into and out of the micro channel for a bio-test, such as a blood test.

BRIEF DESCRIPTION OF THE DRAWINGS

FIG. 1 is a cross-sectional view illustrating a micro-fluidic structure according to an exemplary embodiment.

FIG. 2 is a cross-sectional view illustrating the micro-fluidic structure according to the exemplary embodiment.

FIG. 3 is a cross-sectional view illustrating the micro-fluidic structure according to the exemplary embodiment.

FIG. 4 is a cross-sectional view illustrating the micro-fluidic structure according to the exemplary embodiment.

FIG. 5 is a cross-sectional view illustrating the micro-fluidic structure according to the exemplary embodiment.

FIG. 6 is a cross-sectional view illustrating a micro-fluidic structure according to an exemplary embodiment.

FIG. 7 is a cross-sectional view illustrating the micro-fluidic structure according to the exemplary embodiment.

FIG. 8 is a cross-sectional view illustrating the micro-fluidic structure according to the exemplary embodiment.

FIG. 9 is a cross-sectional view illustrating the micro-fluidic structure according to the exemplary embodiment.

FIG. 10 is a cross-sectional view illustrating the micro-fluidic structure according to the exemplary embodiment.

FIG. 11 is a cross-sectional view illustrating the micro-fluidic structure according to the exemplary embodiment.

FIG. 12 is a cross-sectional view illustrating the micro-fluidic structure according to the exemplary embodiment.

FIG. 13 is a cross-sectional view illustrating the micro-fluidic structure according to the exemplary embodiment.

FIG. 14 is a cross-sectional view illustrating the micro-fluidic structure according to the exemplary embodiment.

FIG. 17 is a cross-sectional view illustrating the micro-fluidic structure according to the exemplary embodiment.

FIG. 18 is a cross-sectional view illustrating the micro-fluidic structure according to the exemplary embodiment.

FIG. 19 is a cross-sectional view illustrating the micro-fluidic structure according to the exemplary embodiment.

FIG. 20 is a cross-sectional view illustrating the micro-fluidic structure according to the exemplary embodiment.

FIG. 21 is a cross-sectional view illustrating the micro-fluidic structure according to the exemplary embodiment.

FIG. 22 is a flow chart for a first method of removing a waste part of a substrate according to an exemplary embodiment.

FIG. 24 is a flow chart for a third method of removing a waste part of a substrate according to an exemplary embodiment.

DETAILED DESCRIPTION

Figure 15:
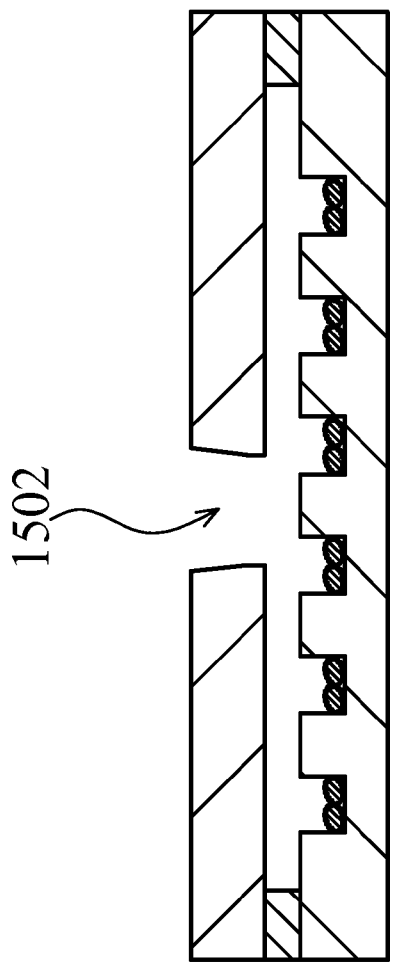
FIG. 15 is a cross-sectional view illustrating the micro-fluidic structure according to the exemplary embodiment.

FIG. 1 is a cross-sectional view illustrating a micro-fluidic structure according to an exemplary embodiment. The micro-fluidic structure 100 includes a first substrate 110, a second substrate 120 and two spacers 130, 132. The first substrate 110 and the second substrate 120 are bonded by the spacers 130, 132. The first substrate 110 and the second substrate 120 may be formed of, for example, silicon, glass, or other materials that are drillable by laser or other drilling or boring device. Between the first substrate 110 and the second substrate 120, micro-channels 134 are formed. Each of the micro-channels 134 contains reagents 136. The reagents 136 may be, for example, bio-chemical reagents or other vulnerable coating.

FIG. 2 is a cross-sectional view illustrating the micro-fluidic structure according to the exemplary embodiment. As shown in FIG. 2, a laser 202 is used to partially drill the first substrate 110 to define a waste part 206, and some particles 204 may be produced during the drilling. It is noted that the partial drill does not cut through the first substrate 110, but rather creates a weakened connection 216 between the first substrate 110 and the waste part 206.

In the exemplary embodiment, a trench 208 is formed between a portion of waste part 206 and the first substrate 110 by the laser 202. The width 210 of the trench 208 may be about 0.1-0.2 millimeter. The thickness 214 of the first substrate 110 may be about 1 millimeter, and the depth 212 of the trench 208 may be about 80 percent of the thickness 214 of the first substrate 110, which is 0.8 millimeter. Additionally, the laser 202 may be, for example, a conventional nanometer/micrometer laser.

FIG. 3 is a cross-sectional view illustrating the micro-fluidic structure according to the exemplary embodiment. As shown in FIG. 3, a cleaning process 302 may be performed on the first substrate 110 to remove the particles 204. The cleaning process 302 may be a dry process or a wet process.

FIG. 4 is a cross-sectional view illustrating the micro-fluidic structure according to the exemplary embodiment. As shown in FIG. 4, the micro-fluidic structure 100 may be flipped over. A megasonic vibration 402 is applied to the first substrate 110 to remove the waste part 206 from the first substrate 110. In the exemplary embodiment, the megasonic vibration 402 may be controlled at 0.3-0.5 megahertz to match a specific dynamic mode of the first substrate 110 and to produce cracks 404 at the weakened connection 216 between the first substrate 110 and the waste part 206.

FIG. 5 is a cross-sectional view illustrating the micro-fluidic structure according to the exemplary embodiment. As shown in FIG. 5, the megasonic vibration 402 continues to be applied to the first substrate 110 so that the cracks (not shown) propagate to break the weakened connection (not shown) between the first substrate 110 and the waste part 206. Then, the waste part 206 drops in a desirable direction and is removed from the first substrate 110. As such, an opening 502 of the micro-fluidic structure 100 is formed.

FIG. 6 is a cross-sectional view illustrating a micro-fluidic structure according to an exemplary embodiment. The micro-fluidic structure 600 includes a first substrate 610, a second substrate 620 and two spacers 630, 632. The first substrate 610 and the second substrate 620 are bonded by the spacers 630, 632. The first substrate 610 and the second substrate 620 may be formed of, for example, silicon, glass, or other materials that are drillable by laser. Between the first substrate 610 and the second substrate 620, micro-channels 634 are formed. Each of the micro-channels 634 contains reagents 636. The reagents 636 may be, for example, bio-chemical reagents or other vulnerable coating.

FIG. 7 is a cross-sectional view illustrating the micro-fluidic structure according to the exemplary embodiment. As shown in FIG. 7, a film 702 is formed over a portion of the first substrate 610. The formation of the film 702 may include depositing a film over part of or the whole surface of the first substrate 610, then patterning the film to remove unnecessary portions. The purpose of the formation of the film 702 is to create a protrusion above the top of the waste part, so the film 702 may be any solid film, such as photoresist or polyimide.

FIG. 8 is a cross-sectional view illustrating the micro-fluidic structure according to the exemplary embodiment. As shown in FIG. 8, a laser 802 or other drilling or boring device is used to partially drill the first substrate 610 around the film 702 to define a waste part 806, and some particles 804 may be produced during the drill. It is noted that the partial drill does not cut through the first substrate 610 but creates a weakened connection 816 between the first substrate 610 and the waste part 806.

In the exemplary embodiment, a trench 808 is formed between a portion of waste part 806 and the first substrate 610 by the laser 802. The width 810 of the trench 808 may be about 0.1-0.2 millimeter. The thickness 814 of the first substrate 610 may be about 1 millimeter, and the depth 812 of the trench 808 may be about 80 percent of the thickness 814 of the first substrate 610, which is 0.8 millimeter. Additionally, the laser 802 may be, for example, a conventional nanometer/micrometer laser.

FIG. 9 is a cross-sectional view illustrating the micro-fluidic structure according to the exemplary embodiment. As shown in FIG. 9, a cleaning process 902 may be performed on the first substrate 610 to remove the particles 804. The cleaning process 902 may be a dry process or a wet process.

FIG. 10 is a cross-sectional view illustrating the micro-fluidic structure according to the exemplary embodiment. As shown in FIG. 10, a tape 1002 is placed on the first substrate 610 and the film 702.

FIG. 11 is a cross-sectional view illustrating the micro-fluidic structure according to the exemplary embodiment. As shown in FIG. 11, a roller 1102 rolls over the first substrate 610 and the film 702 for the attachment of the tape 1002 to the first substrate 610 and the film 702.

FIG. 12 is a cross-sectional view illustrating the micro-fluidic structure according to the exemplary embodiment. As shown in FIG. 12, when the roller 1102 rolls over the film 702 on the waste part 806, the roller 1102 pushes the waste part 806 because of the protrusion of the film 702. Due to stress concentration, the roller 1102 further breaks the weakened connection (not shown) between the waste part 806 and the first substrate 610. Therefore, the waste part 806 is separated from the first substrate 610.

FIG. 13 is a cross-sectional view illustrating the micro-fluidic structure according to the exemplary embodiment. As shown in FIG. 13, the roller 1102 finishes rolling over the first substrate 610. The waste part 806 still attaches to the tape 1002 through the film 702 instead of dropping into the micro-fluidic structure 600.

FIG. 14 is a cross-sectional view illustrating the micro-fluidic structure according to the exemplary embodiment. As shown in FIG. 14, the tape 1002 is detached from the first substrate 610 so that the waste part 806 is removed from the first substrate 610 of the micro-fluidic structure 600.

FIG. 15 is a cross-sectional view illustrating the micro-fluidic structure according to the exemplary embodiment. As shown in FIG. 15, an opening 1502 of the micro-fluidic structure 600 is formed so that a fluid inlet/outlet is provided.

Figure 16:
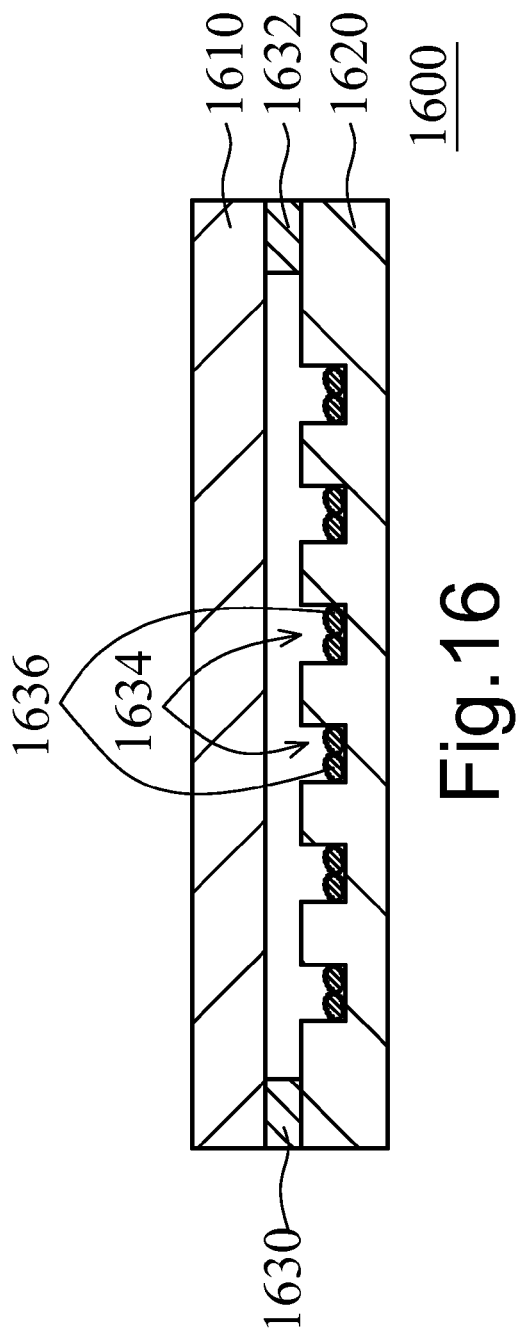
FIG. 16 is a cross-sectional view illustrating a micro-fluidic structure according to an exemplary embodiment.

FIG. 16 is a cross-sectional view illustrating a micro-fluidic structure according to an exemplary embodiment. The micro-fluidic structure 1600 includes a first substrate 1610, a second substrate 1620 and two spacers 1630, 1632. The first substrate 1610 and the second substrate 1620 are bonded by the spacers 1630, 1632. The first substrate 1610 and the second substrate 1620 may be formed of, for example, silicon, glass, or other materials that are drillable by laser or other drilling or boring devices. Between the first substrate 1610 and the second substrate 1620, micro-channels 1634 are formed. Each of the micro-channels 1634 contains reagents 1636. The reagents 1636 may be, for example, bio-chemical reagents or other vulnerable coating.

FIG. 17 is a cross-sectional view illustrating the micro-fluidic structure according to the exemplary embodiment. As shown in FIG. 17, a magnetic film 1702 is formed over a portion of the first substrate 1610. The formation of the magnetic film 1702 may include depositing a magnetic film over a part of or the whole surface of the first substrate 1610, then patterning the magnetic film to remove unnecessary portions.

FIG. 18 is a cross-sectional view illustrating the micro-fluidic structure according to the exemplary embodiment. As shown in FIG. 18, a laser 1802 or other drilling or boring device is used to partially drill the first substrate 1610 around the magnetic film 1702 to define a waste part 1806, and some particles 1804 may be produced during the drill. It is noted that the partial drill does not cut through the first substrate 1610.

In the exemplary embodiment, a trench 1808 is formed between a portion of waste part 1806 and the first substrate 1610 by the laser 1802. The width 1810 of the trench 1808 may be about 0.1-0.2 millimeter. The thickness 1814 of the first substrate 1610 may be about 1 millimeter, and the depth 1812 of the trench 1808 may be about 80 percent of the thickness 1814 of the first substrate 1610, which is 0.8 millimeter. Additionally, the laser 1802 may be, for example, a conventional nanometer/micrometer laser.

FIG. 19 is a cross-sectional view illustrating the micro-fluidic structure according to the exemplary embodiment. As shown in FIG. 19, a cleaning process 1902 may be performed on the first substrate 1610 to remove the particles 1804. The cleaning process 1902 may be a dry process or a wet process.

FIG. 20 is a cross-sectional view illustrating the micro-fluidic structure according to the exemplary embodiment. As shown in FIG. 20, an electromagnet 2002 at a desired location is activated to attract the waste part 1806 with the magnetic film 1702. Additionally, the laser 1802 is used to drill through the first substrate 1610 around the magnetic film 1702 to separate the waste part 1806 from the first substrate 1610. It is noted that the cleaning process need not be performed again because only a small portion of the first substrate 1610 needs to be drilled through and the particles generated are limited.

FIG. 21 is a cross-sectional view illustrating the micro-fluidic structure according to the exemplary embodiment. As shown in FIG. 21, the waste part 1806 is attracted by the activated electromagnet 2002 instead of dropping into the micro-fluidic structure 1600. The waste part 1806 is removed from the first substrate 1610 of the micro-fluidic structure 1600. As such, an opening 2102 of the micro-fluidic structure 1600 is formed so that a fluid inlet/outlet is provided.

FIG. 22 is a flow chart for a method of removing a waste part of a substrate according to a first exemplary embodiment. As shown in FIG. 22, the method 2200 includes the following operations: using a laser to partially drill the substrate to define the waste part (2202); and applying megasonic vibration to the substrate to remove the waste part from the substrate (2204).

In the exemplary embodiment, the method 2200 may further include performing a cleaning process on the substrate. In the exemplary embodiment, the method 2200 may further include flipping over the substrate after using the laser to partially drill the substrate. In the exemplary embodiment, the operation 2202 may further include forming a trench between a portion of waste part and the substrate. In the exemplary embodiment, the operation 2204 may further include applying megasonic vibration of 0.3-0.5 megahertz to the substrate to break a connection between the waste part and the substrate.

Figure 23:
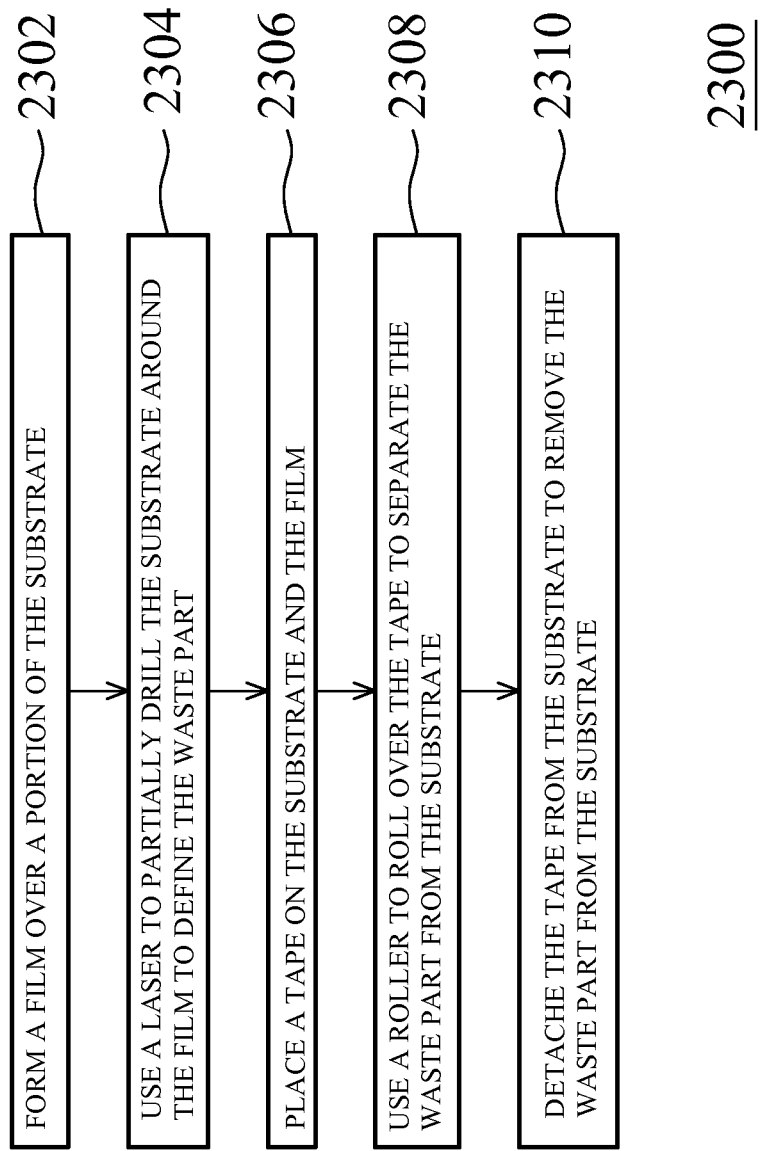
FIG. 23 is a flow chart for a second method of removing a waste part of a substrate according to an exemplary embodiment.

FIG. 23 is a flow chart for a method of removing a waste part of a substrate according to a second exemplary embodiment. As shown in FIG. 23, the method 2300 includes the following operations: forming a film over a portion of the substrate (2302); using a laser to partially drill the substrate around the film to define the waste part (2304); placing a tape on the substrate and the film (2306); using a roller to roll over the tape to separate the waste part from the substrate (2308); and detaching the tape from the substrate to remove the waste part from the substrate (2310).

In the exemplary embodiment, the method 2300 may further include performing a cleaning process on the substrate. In the exemplary embodiment, the operation 2302 may further include forming a film made of photoresist or polyimide over the portion of the substrate. In the exemplary embodiment, the operation 2304 may further include forming a trench between a portion of waste part and the substrate. In the exemplary embodiment, the operation 2308 may further include breaking a connection between the waste part and the substrate.

FIG. 24 is a flow chart for a method of removing a waste part of a substrate according to a third exemplary embodiment. As shown in FIG. 24, the method 2400 includes the following operations: forming a magnetic film over a portion of the substrate (2402); using a laser to partially drill the substrate around the magnetic film to define the waste part (2404); activating an electromagnet to attract the waste part with the magnetic film (2406); and using the laser to drill through the substrate around the magnetic film to separate the waste part from the substrate (2408).

In the exemplary embodiment, the method 2400 may further include performing a cleaning process on the substrate. In the exemplary embodiment, the method 2400 may further include using the electromagnet to remove the waste part from the substrate. In the exemplary embodiment, the operation 2404 may further include forming a trench between a portion of waste part and the substrate.

According to an exemplary embodiment of the disclosure, a method of removing a waste part of a substrate is provided. The method includes: using a laser to partially drill the substrate to define the waste part; and applying megasonic vibration to the substrate to remove the waste part from the substrate.

According to an exemplary embodiment of the disclosure, a method of removing a waste part of a substrate is provided. The method includes: forming a film over a portion of the substrate; using a laser to partially drill the substrate around the film to define the waste part; placing a tape on the substrate and the film; using a roller to roll over the tape to separate the waste part from the substrate; and detaching the tape from the substrate to remove the waste part from the substrate.

According to an exemplary embodiment of the disclosure, a method of removing a waste part of a substrate is provided. The method includes: forming a magnetic film over a portion of the substrate; using a laser to partially drill the substrate around the magnetic film to define the waste part; activating an electromagnet to attract the waste part with the magnetic film; and using the laser to drill through the substrate around the magnetic film to separate the waste part from the substrate.

According to an exemplary embodiment of the disclosure, a device for removing a waste part of a substrate is provided. The device includes: a laser module which is configured to generate a laser to partially drill the substrate to define the waste part; and a waste part removal module which is configured to remove the waste part of the substrate.

In the exemplary embodiment, the laser module may further form a trench between a portion of waste part and the substrate. In the exemplary embodiment, the device may further include a cleaning device which is configured to perform a cleaning process on the substrate. In the exemplary embodiment, the waste part removal module may include: a substrate flipping module which is configured to flip over the substrate; and a megasonic generating module which is configured to apply megasonic vibration to the substrate to break a connection between the waste part and the substrate.

In the exemplary embodiment, the waste part removal module may include: a film forming device which is configured to form a film over a portion of the substrate; a tape placing module which is configured to place a tape on the substrate and the film; a roller module which is configured to roll over the tape to separate the waste part from the substrate; and a tape detaching module which is configured to detach the tape from the substrate to remove the waste part from the substrate.

In the exemplary embodiment, the laser module may further drill through the substrate around the magnetic film to separate the waste part from the substrate, and the waste part removal module may include: a film forming device which is configured to form a magnetic film over a portion of the substrate; and an electromagnet module which is configured to attract the waste part with the magnetic film.

This written description uses examples to disclose embodiments of the disclosure, include the best mode, and also to enable a person of ordinary skill in the art to make and use various embodiments of the disclosure. The patentable scope of the disclosure may include other examples that occur to those of ordinary skill in the art. One of ordinary skill in the relevant art will recognize that the various embodiments may be practiced without one or more of the specific details, or with other replacement and/or additional methods, materials, or components. Well-known structures, materials, or operations may not be shown or described in detail to avoid obscuring aspects of various embodiments of the disclosure. Various embodiments shown in the figures are illustrative example representations and are not necessarily drawn to scale. Particular features, structures, materials, or characteristics may be combined in any suitable manner in one or more embodiments. Various additional layers and/or structures may be included and/or described features may be omitted in other embodiments. Various operations may be described as multiple discrete operations in turn, in a manner that is most helpful in understanding the disclosure. However, the order of description should not be construed as to imply that these operations are necessarily order dependent. In particular, these operations need not be performed in the order of presentation. Operations described herein may be performed in a different order, in series or in parallel, than the described embodiments. Various additional operations may be performed and/or described. Operations may be omitted in additional embodiments.

This written description and the following claims may include terms, such as left, right, top, bottom, over, under, upper, lower, first, second, etc. that are used for descriptive purposes only and are not to be construed as limiting. For example, terms designating relative vertical position may refer to a situation where a device side (or active surface) of a substrate or integrated circuit is the "top" surface of that substrate; the substrate may actually be in any orientation so that a "top" side of a substrate may be lower than the "bottom" side in a standard terrestrial frame of reference and may still fall within the meaning of the term "top." The term "on" as used herein (including in the claims) may not indicate that a first layer "on" a second layer is directly on and in immediate contact with the second layer unless such is specifically stated; there may be a third layer or other structure between the first layer and the second layer on the first layer. As an example, the structures, layouts, materials, operations, voltage levels, or current levels related to "source" and "drain" described herein (including in the claims) may be interchangeable as a result of transistors with "source" and "drain" being symmetrical devices. The term "substrate" may refer to any construction comprising one or more semiconductive materials, including, but not limited to, bulk semiconductive materials such as a semiconductive wafer (either alone or in assemblies comprising other materials thereon), and semiconductive material layers (either alone or in assemblies comprising other materials). The embodiments of a device or article described herein can be manufactured, used, or shipped in a number of positions and orientations. Persons skilled in the art will recognize various equivalent combinations and substitutions for various components shown in the figures.

What is claimed is:

1. A method comprising:
   forming a film, having a thickness, over a portion of a surface of a substrate;
   using a laser to drill, into the substrate, a trench that
      extends downward from the substrate's surface partially through the substrate,
      extends around the film to define a waste part from the substrate, and
      forms, at a bottom of the trench, a weakened connection between the waste part and the substrate;
   placing a tape on the substrate and the film;
   rolling a roller over the tape such that force from the roller against the film, due to the film's thickness, forces the waste part downward below the substrate's surface, which causes the weakened connection to break; and
   detaching the tape from the substrate to remove the waste part from the substrate.

2. The method of claim 1, further comprising, after the drilling of the trench and before the placing of the tape:
   performing a cleaning process on the substrate.

3. The method of claim 1, wherein the film is made of photoresist or polyimide.

4. The method of claim 1, wherein the using of the roller attaches the tape to the substrate and to the film.

5. The method of claim 1, wherein the waste part is disposed below the film.

6. A method comprising:
   forming a protrusion, having a thickness, over a surface of a portion of the substrate;
   performing a process to define a waste part from the substrate, by forming a weakened connection between the waste part and the substrate;
   placing a tape on the substrate and the protrusion;
   pushing a pushing component over the tape such that force from the pushing component against the protrusion, due to the protrusion's thickness, forces the waste part downward below the substrate's surface which causes the weakened connection to break; and
   detaching the tape from the substrate to remove the waste part from the substrate.

7. The method of claim 6, further comprising, after the performing of the process and before the placing of the tape:
   performing a cleaning process on the substrate to remove particles generated by the process defining the waste part.

8. The method of claim 6, wherein the protrusion comprises photoresist or polyimide.

9. The method of claim 6, wherein the performing of the process to define the waste part comprises using a laser to partially drill the substrate around the protrusion.

10. The method of claim 6, wherein the pushing component is a roller that rolls over the tape.

11. The method of claim 10, wherein the using of the roller attaches the tape to the substrate and to the protrusion.

12. The method of claim 6, wherein the waste part is disposed below the protrusion.

13. The method of claim 6, wherein the pushing of the pushing component attaches the protrusion to the waste part.

14. The method of claim 6, wherein the pushing of the pushing component attaches the protrusion to the substrate.

15. The method of claim 6, wherein the process includes drilling around the protrusion.

16. The method of claim 6, wherein the substrate and the waste part are located above a cavity, such that the pushing pushes the waste part partially into the cavity.

17. A method comprising:
   forming a film, having a thickness, over a portion of a top surface of a substrate of a micro-fluidic structure;
   using a laser to drill, into the substrate, a trench that
      extends downward from the substrate's surface partially through the substrate,
      extends around the film to define a waste part from the substrate, and
      forms, at a bottom of the trench, a weakened connection between the waste part and the substrate;
   placing a tape on the top substrate and the film;
   rolling a roller over the tape such that force from the roller against the film, due to the film's thickness, forces the waste part downward below the substrate's surface, which causes the weakened connection to break; and
   detaching the tape from the top substrate to remove the waste part from the top substrate.

18. The method of claim 17, wherein the waste part sticks to the tape and does not drop into a channel disposed between the top substrate and the bottom substrate.

19. The method of claim 17, further comprising, after the drilling of the trench and before placing of the tape:

performing a cleaning process on the micro-fluidic structure.

20. The method of claim 17, wherein the film comprises photoresist or polyimide.

21. The method of claim 17, wherein the waste part is disposed below the film.

* * * * *